United States Patent [19]

Harasaki et al.

[11] Patent Number: 4,747,636

[45] Date of Patent: May 31, 1988

[54] ARRANGEMENT FOR FORMING VEHICLE BODIES

[75] Inventors: Hayatsugu Harasaki; Tsuginobu Tomita, both of Hiroshima; Mitsunori Katayama, Higashihiroshima; Tamiko Aonuma; Masahiro Hirao, both of Hiroshima, all of Japan

[73] Assignee: Mazda Motor Corporation, Hiroshima, Japan

[21] Appl. No.: 922,264

[22] Filed: Oct. 23, 1986

[30] Foreign Application Priority Data

| Oct. 26, 1985 | [JP] | Japan | 60-240247 |
| Oct. 30, 1985 | [JP] | Japan | 60-243418 |
| Oct. 30, 1985 | [JP] | Japan | 60-243423 |
| Oct. 30, 1985 | [JP] | Japan | 60-243425 |

[51] Int. Cl.$^4$ ............... B62D 25/00; B60R 21/13
[52] U.S. Cl. ................. 296/186; 296/203; 296/208; 280/756; 280/804
[58] Field of Search ............ 296/107, 186, 187, 195, 296/203, 204, 198, 209, 30, 208; 280/756, 804

[56] References Cited

U.S. PATENT DOCUMENTS

| 2,007,255 | 7/1935 | Rohr | 296/187 |
| 2,164,098 | 6/1939 | Tjaarda | 296/203 |
| 2,289,173 | 7/1942 | Best | 296/107 |
| 2,380,523 | 7/1945 | Hicks et al. | 296/30 X |
| 3,423,122 | 1/1969 | Wessells, III | 296/186 X |
| 3,524,674 | 8/1970 | Medeiros | 296/102 |
| 4,234,225 | 11/1980 | Harasaki et al. | 296/195 X |
| 4,350,367 | 9/1982 | Kolb et al. | 296/102 X |
| 4,457,555 | 7/1984 | Draper | 296/186 |
| 4,516,803 | 5/1985 | Kaltz et al. | 296/107 |

FOREIGN PATENT DOCUMENTS

| 60-18042 | 2/1985 | Japan . | |
| 60-45210 | 3/1985 | Japan . | |
| 0255578 | 12/1985 | Japan | 296/30 |
| 705061 | 3/1954 | United Kingdom | 296/204 |
| 1075957 | 7/1967 | United Kingdom | 296/102 |

Primary Examiner—Dennis H. Pedder
Attorney, Agent, or Firm—Gerald J. Ferguson, Jr.; Michael P. Hoffman; Michael J. Foycik, Jr.

[57] ABSTRACT

An arrangement for forming partially a vehicle body of the open-top type comprises a front header member provided at an upper end portion of a front windshield for interconnecting therethrough right and left front pillars which are provided at right and left side portions of the front windshield, respectively, and a center frame member including a lateral part which is connected at a front end portion thereof to a central portion of the front header member and elongates in the direction of the length of the body and a vertical part which elongates in the direction of the height of the body with its upper end portion connected to a rear end portion of the lateral part and its lower end portion connected to a floor panel member.

27 Claims, 9 Drawing Sheets

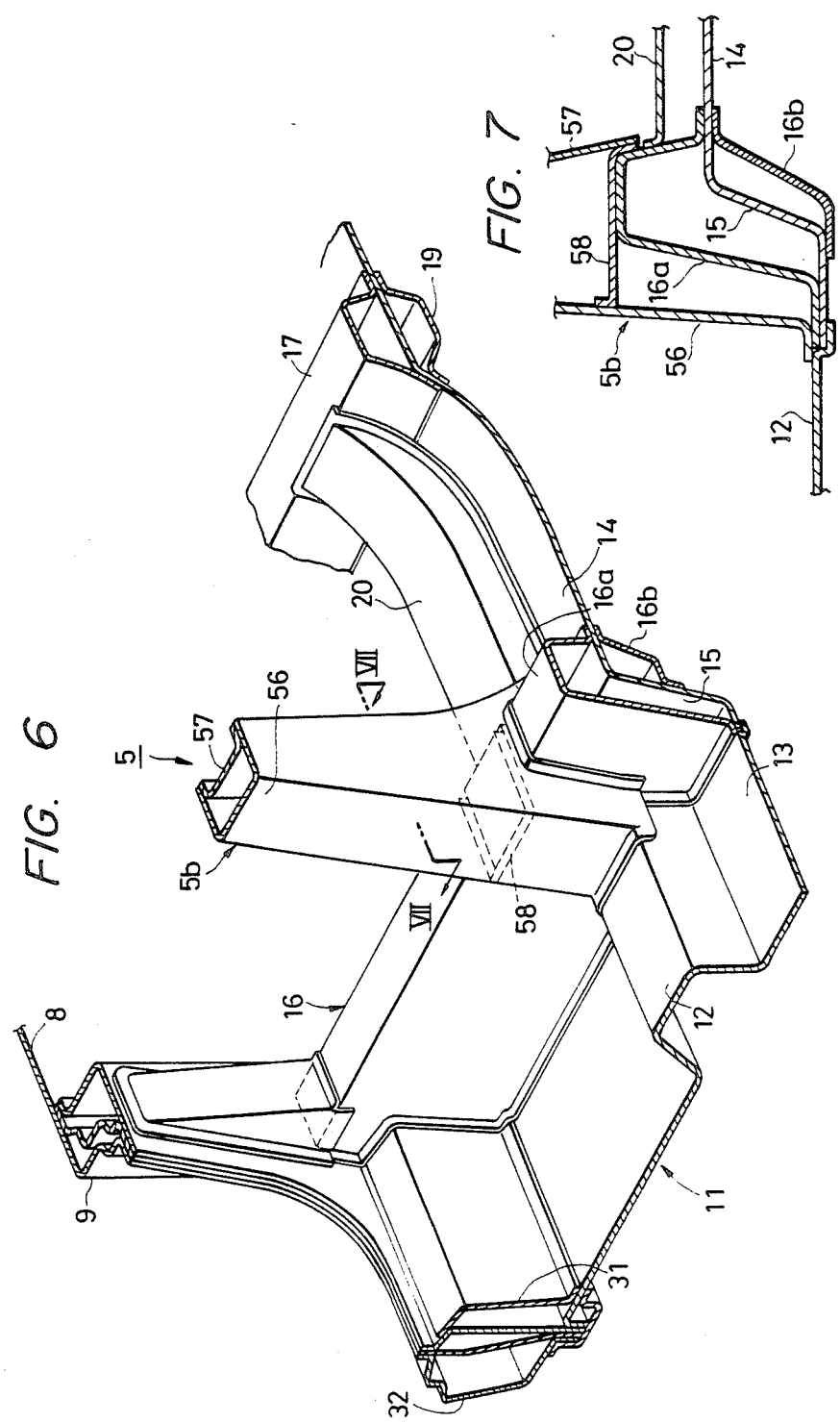

ARRANGEMENT FOR FORMING VEHICLE BODIES

BACKGROUND OF THE INVENTION

1. Field of the Invention

The present invention relates generally to arrangemens for forming vehicle bodies, and more particularly, is directed to an improvement in an arrangement for forming partially a vehicle body of the cabriolet type.

2. Description of the Prior Art

There has been previously proposed a vehicle with a body of the cabriolet type provided with a folding top which is folded up to make an open room in the body as occasion demands as disclosed in U.S. Pat. No. 4,516,803, issued on 14 May 1985.

In such a vehicle with the cabriolet type body having an open space above a room portion, there is generally a disadvantage that the body is apt to be insufficient in structural stability, especially at portions around a front windshield, side panel portions and a floor portion thereof. Accordingly, in the case of the cabriolet type body, side sills disposed respectively at both of the right and left sides of a floor panel and cross members elongating in the direction of the width of the body or the like are positioned to be higher than those in vehicles with bodies of other types, for the purpose of reinforcing especially the portions around the front windshield, the side panel portions and the floor portion. However, in actual, it is quite difficult to reinforce the cabriolet type body sufficiently by shifting the positions of the side sills and the cross members or the like.

There is another problem in relation to a safety belt in the previously proposed vehicle with the cabriole type body. That is, it is usual in a vehicle with an ordinary closed body that each of safety belts for a driver's seat and a navigator's seat respectively is provided with its one end attached to an upper portion of a right or left center pillar adjacent to a right or left roofing side member. While, in the case of the previously proposed vehicle with the cabriolet type body, a top of a center pillar is restricted to be low and therefore there is no appropriate portion to which one end of the safety belt is desirably attached.

A further problem arises in connection with ventilation in the previously proposed vehicle with the cabriolet type body. Air conditioning is also desired for a vehicle with a cabriolet type body, particularly, in the condition in which the room is covered with the folding top, and it is generally required for an effective air conditioning in a vehicle to make downward air flow from upside in a room of the vehicle. However, the previously proposed vehicle with the cabriolet type body does not have any portion nor any member usable for supporting an air duct for making downward air flow in the room, and consequently the effective air conditioning is not carried out in the room of the previously proposed vehicle with the cabriolet type body.

OBJECTS AND SUMMARY OF THE INVENTION

Accordingly, it is an object of the present invention to provide an arrangement for forming partially a vehicle body which avoids the foregoing problems encountered with the prior art.

Another object of the present invention is to provide an arrangement for forming partially a vehicle body, with which an open-top type vehicle body having sufficient structural stability even at portions around a front windshield and a floor portion thereof is obtained.

A further object of the present invention is to provide an arrangement for forming partially a vehicle body, by which an open-top type vehicle body having sufficient structural stability at portions around a front windshield, side panel portions and a floor portion thereof is obtained.

A further object of the present invention is to provide an arrangement for forming partially a vehicle body, with which an open-top type vehicle body having sufficient structural stability even at portions around a front windshield and a floor portion thereof is obtained with a reinforcing member with which a safety belt can be engaged in a desirable manner.

A still further object of the present invention is to provide an arrangement for forming partially a vehicle body, with which an open-top type vehicle body having sufficient structural stability even at portions around a front windshield and a floor portion thereof is obtained with a reinforcing member which can be used as an air duct for making downward air flow in a room space provided on the body.

According to the present invention, there is provided an arrangement for forming partially a vehicle body of the open-top type, which comprises a front header member provided at an upper end portion of a front windshield for interconnecting therethrough right and left front pillars, and a center frame member composed of a lateral part elongating in the direction of the length of the body with its front end portion connected to a central portion of the front header member and a vertical part elongating in the direction of the height of the body with its upper end portion connected to a rear end portion of the lateral part and its lower end portion connected to a floor panel member.

In one embodiment of the invention, the arrangement further comprises, in addition to the front header member and the center frame member, right and left center pillars elongating upward from right and left side portions of the floor panel member at front end portions of right and left side panel members, respectively, and a cross member elongating in the direction of the width of the body for coupling therethrough the lower end portion of the vertical part of the center frame member with each of lower ends of the right and left center pillars and being connected to the floor panel member so as to create a framed cross section together with the floor panel member.

In another embodiment of the invention, at least one end of a safety belt for a driver's seat or a navigator's seat is engaged with the center frame member.

In a further embodiment of the invention, the center frame member forms therein an air duct for making downward air flow in a room space provided in the body.

In the arrangement thus constituted in accordance with the present invention, the right and left front pillars are interconnected through the front header member and the central portion of the front header member is connected through the center frame member to the floor panel member, and therefore portions around the front windshield and a floor portion of the body are reinforced by a connecting structure composed of the front header member and the center frame member so as to have sufficiently increased structural stability. In this arrangement, it is preferable that the lower end portion of the vertical part of the center frame member is connected to a floor tunnel portion of the floor panel member, which is possessed of increased structural intensity in the floor panel member.

In the embodiment, the center frame member is connected through the cross member, which is connected to the floor panel member to create the framed cross section together with the floor panel member, to both of the right and left center pillars. Accordingly, the body is increased in structural stability especially at portions thereof around each of right and left side panel members. In this case, it is preferable that the cross member comprises a lower component connected to the floor panel member and an upper component fixed on the lower component so as to form a framed cross section together with the latter. Such a cross member comprising the upper and lower components connected to each other is possessed of increased structural stability.

In another embodiment, one end of the safety belt for the driver's seat or the navigator's seat is attached or connected movably to the vertical part or the lateral part of the center frame member, so that the safety belt is installed in a preferable manner in a room space formed in the body. It is possible to install a so-called passive safety belt, which is fastened and released selectively and automatically in response to closing and opening of a side door mounted to the body, to the lateral part of the center frame member.

Further, in the embodiment, the air duct is provided along the center frame member for making the downward air flow in the room space formed in the body and therefore effective air conditioning is carried out in the room space, especially in the condition in which the room space is covered with a folding top. It is preferable that the center frame member is formed to have a framed cross section which is used as the air duct. In such a case, the number of parts for constituting an air conditioning system is desirably reduced.

The above, and other objects, features and advantages of the present invention will become apparent from the following detailed description which is to be read in conjunction with the accompanying drawings.

BREIF DESCRIPTION OF THE DRAWINGS

FIG. 6 is a schematic perspective view showing a part of the vehicle body shown in FIG. 1;

FIG. 7 is a schematic cross-sectional view taken on line VII—VII of FIG. 6;

DESCRIPTION OF THE PREFERRED EMBODIMENTS

Now, embodiments of arrangement for forming a vehicle body according to the present invention will be described in detail with reference to the accompanying drawings hereinafter.

Figure 1:
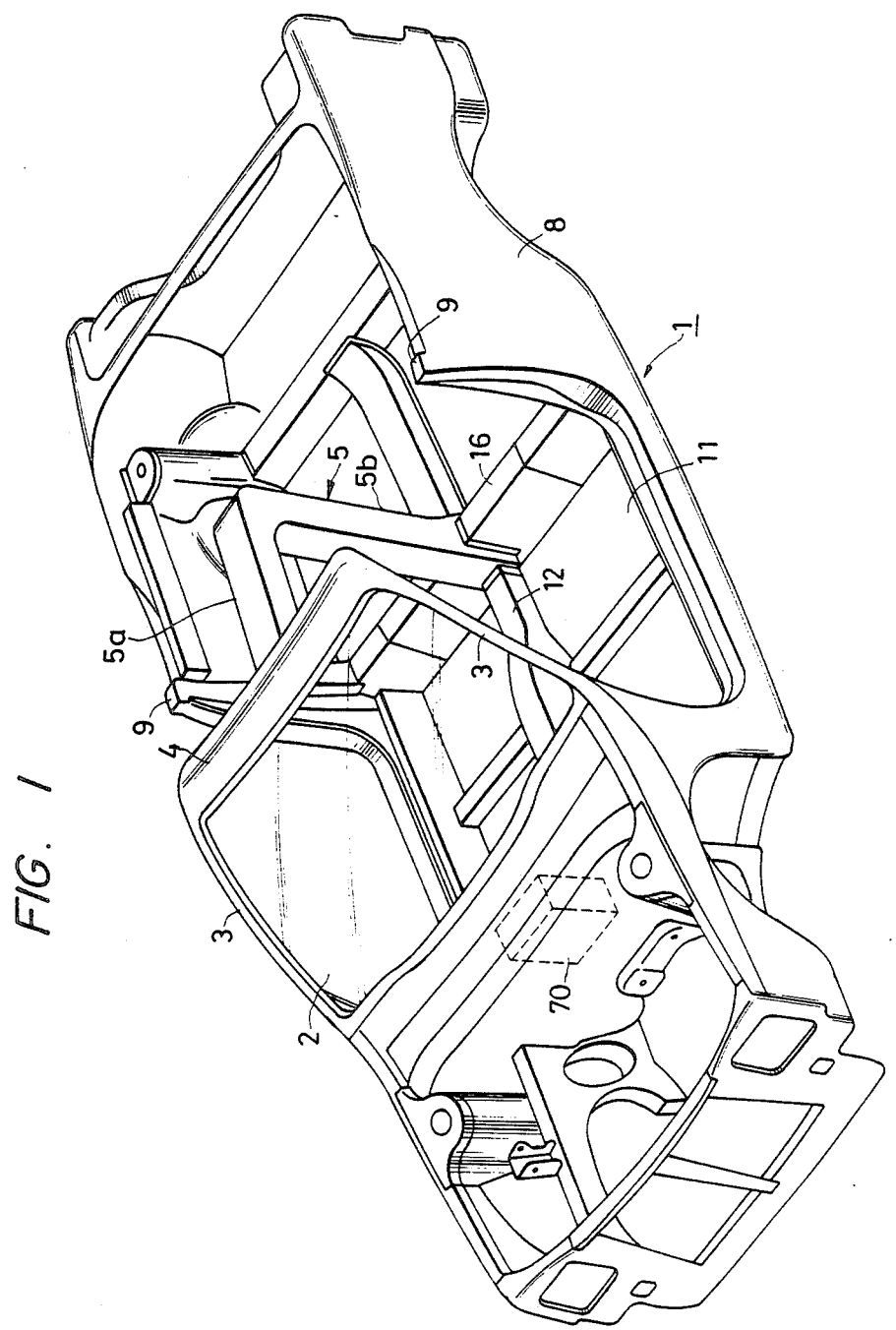
FIG. 1 is a schematic perspective view showing a vehicle body of the open-top type to which an embodiment of arrangement for forming a vehicle body according to the present invention is applied.

FIG. 1 shows schematically a vehicle body of the open-top type to which one example of the arrangement for forming a vehicle body according to the present invention is applied.

Referring to FIG. 1, a vehicle body 1 of the open-top type is provided with a front windshield 2 and a pair of right and left front pillar 3 supporting the right and left side portions of the front windshield 2, respectively. A front header member 4 is also disposed between the right and left front pillars 3 to elongate in the direction of the width of the vehicle body 1 with its right and left ends incorporated with the upper ends of the right and left front pillars 3, respectively, so as to interconnect therethrough the right and left front pillars 3 and support the upper end portion of the front windshield 2. The central portion of the front header member 4 is connected through a center frame member 5 to a floor panel member 11. The center frame member 5 comprises a lateral part 5a elongating in the direction of the length of the vehicle body 1 with its front end portion incorporated with the central portion of the front header member 4 and a vertical part 5b elongating in the direction of the height of the vehicle body 1 with its upper end portion incorporated with a rear end portion of the lateral part 5a and its lower end portion coupled with a floor tunnel portion 12 formed on the floor panel member 11.

The vehicle body 1 is further provided with right and left side panel members 8, a pair of right and left center pillars 9 positioned respectively at the front end portions of the right and left side panel members 8 to elongate upward from the right and left side portions of the floor panel member 11, and an air conditioning unit 70 disposed under the lower end portion of the front windshield 2.

The front end portion of the lateral part 5a of the center frame member 5 is connected to the central portion of the front header member 4 in such a manner as shown in FIGS. 2 to 5.

Figure 2:
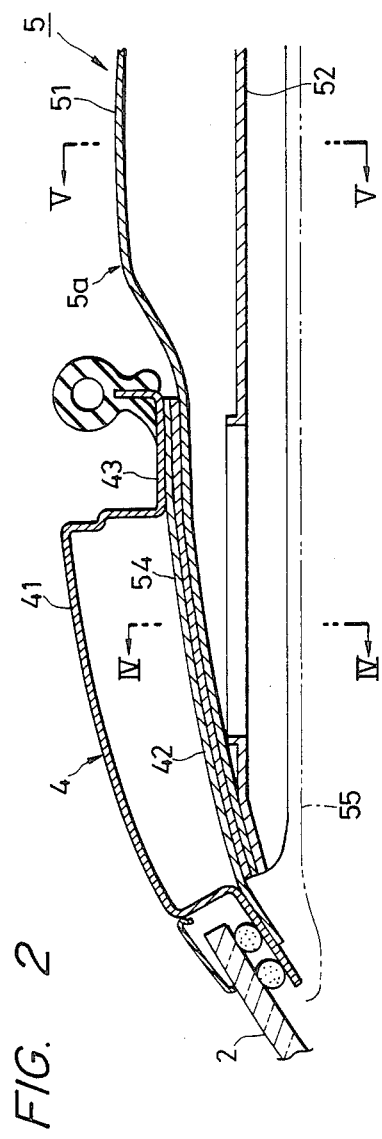
FIG. 2 is a cross-sectional view showing a portion of the embodiment shown in FIG. 1.
Figure 3:
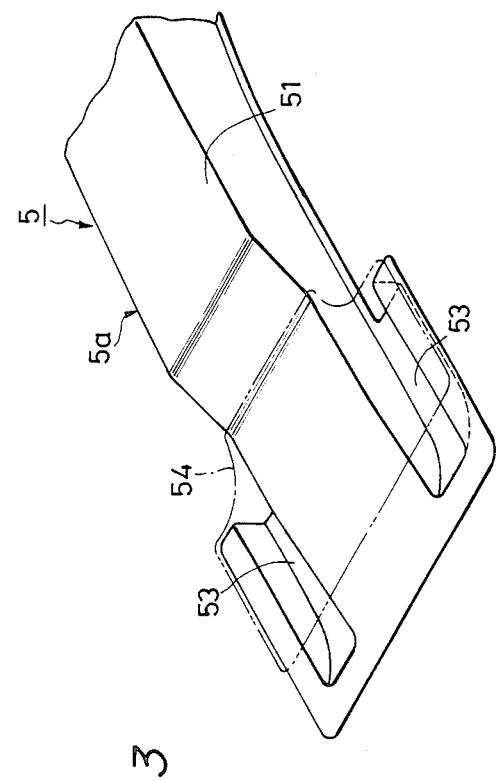
FIG. 3 is a schematic plan view showing a portion of a center frame member employed in embodiment shown in FIG. 1.
Figure 4:
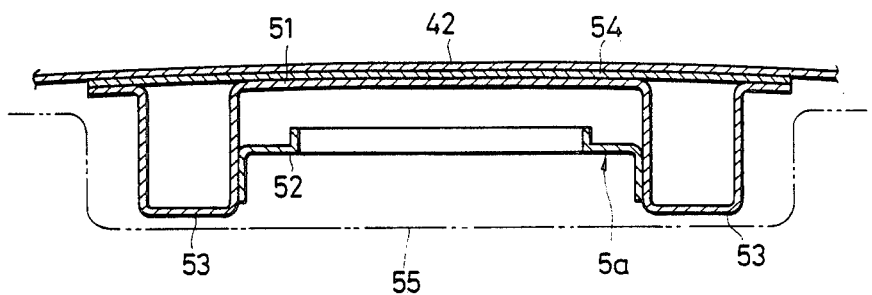
FIG. 4 is a schematic cross-sectional view taken on line IV—IV of FIG. 2.

Referring to FIGS. 2 to 5, the front header member 4 is composed of an upper panel 41 and a lower panel 42 coupled with each other to form a framed cross section therebetween and provided with a roof gutter 43 as shown in FIG. 2, while the lateral part 5a of the center frame member 5 is composed of an upper frame component 51 and a lower frame component 52 coupled with each other to form a rectangular framed cross section therebetween as shown in FIG. 2. As shown in FIGS. 2 and 3, the front end portion of the lateral part 5a of the center frame member 5 is so constituted as to reduce the height of the rectangular framed cross section therein gradually with positional shifts toward the front header member 4 and provided with a pair of reinforcing depressions 53 formed on side projections of the upper frame component 51, and a portion of the upper frame component 51 at the front end portion of the lateral part 5a is attached through an intermediate plate 54 to the lower panel 42 of the front header member 4, so that the front end portion of the lateral part 5a is coupled with the central portion of the front header member 4. Inner surfaces of the lateral part 5a of the center frame member 5 and the front header member 4 are covered by a trimming member 55.

The lower end portion of the vertical part 5b of the center frame member 5 is connected to the floor tunnel portion 12 formed on the floor panel member 11 in such a manner as shown in FIGS. 6 and 7.

Referring to FIGS. 6 and 7, the floor panel member 11 comprises a front panel component 13 having a part thereof formed into the floor tunnel portion 12, a rear panel component 14 disposed behind the front panel component 13 to be higher than the front panel component 13, and a slant panel component 15 incorporated with the rear panel component 14 to extend downward from the front end of the rear panel component 14 toward the front panel component 13 and connected at its front end to the rear end of the front panel component 13. In connection with the floor panel member 11 thus constituted, cross members 16, 17 and 19 each elongating in the direction of the width of the vehicle body 1 are provided.

The cross member 16 is composed of an upper cross member component 16a which is connected to the upper surface of the slant panel component 15 so as to form a framed cross section together with the slant panel component 15 and couples therethrough the lower end portion of the vertical part 5b of the center frame member 5 with each of the lower ends of the right and left center pillars 9, and a lower cross member component 16b which is connected to the under surface of the slant panel component 15 so as to form a framed cross section together with the slant panel component 15 at a location on the under surface of the slant panel component 15 corresponding to the upper cross member component 16a. With such a configuration, the cross member 16 itself has increased structural stability.

The cross member 17 is connected to the upper surface of the rear panel component 14 so as to form a framed cross section together with the rear panel component 14 and the cross member 19 is connected to the under surface of the rear panel component 14 so as to form a framed cross section together with the rear panel component 14 at a location on the under surface of the rear panel component 14 corresponding to the cross member 17.

Further, on the rear panel component 14, a reinforcing member 20 is fixed to elongate in the direction of the length of the vehicle body 1 between the upper side member component 16a on the cross member 16 and the cross member 17.

The vertical part 5b of the center frame member 5 comprises a front frame component 56 and a rear frame component 57 coupled with each other to form a framed cross section. The lower portions of the front and rear frame components 56 and 57 are so shaped as to cause the framed cross section formed thereby to have a dimension in the direction of the length of the vehicle body 1 which is increased gradually with positional shifts toward the lower end portion of the vertical part 5b. Further, a reinforcing plate member 58 is provided to be surrounded by the lower portions of the front and rear frame components 56 and 57. The lower end portion of the vertical part 5b of the center frame member 5 is connected to the floor panel member 11 in such a manner that the front portion of the front frame component 56 bestrides the floor tunnel portion 12 in the direction of the width of the vehicle body 1 and the rear portion of the front frame component 56 bestrides the upper cross member component 16a in the direction of the length of the vehicle body 1.

On each of the right and left side portions of the front panel component 13 of the floor panel member 11, a side member 31 is fixed to elongate in the direction of the length of the vehicle body 1 and a side sill 32 is provided in the outside of the floor panel member 11 at a position corresponding to the side member 31.

In the vehicle body 1 to which the embodiment of arrangement according to the present invention is applied as mentioned above, the right and left front pillars 3 are interconnected through the front header member 4 which has the framed cross section and is disposed at the upper end portion of the front windshield 2 and the central portion of the front header member 4 is connected to the floor panel member 11 through the center frame member 5 which comprises the lateral part 5a and the vertical part 5b having the respective framed cross sections. Accordingly, portions around the front windshield 2 and a floor portion including the floor panel member 11 are reinforced by a connecting structure composed of the front header member 4 and the center frame member 5 so as to be sufficiently improved in structural stability.

Especially, the lower end portion of the vertical part 5b of the center frame member 5 is connected to the floor tunnel portion 12 of the floor panel member 11, which is possessed of increased structural intensity in the floor panel member 11, and the upper cross member component 16a of the cross member 16 is coupled with the lower end portion of the vertical part 5b at both of the right and left sides of the same, and therefore a strong and stable connecting structure including the vertical part 5b, the floor tunnel portion 12 and the upper cross member component 16a is obtained. Further, since the lower end portion of the vertical part 5b of the center frame member 5 is connected through the upper cross member component 16a of the cross member 16, which is connected to the floor panel member 11 to create the framed cross section together with the floor panel member 11, to each of the right and left center pillars 9 which are disposed respectively at the front end portions of the right and left side panel members 8, the vehicle body 1 is increased in structural stability especially at portions thereof around each of the right and left side panel members 8.

Although, in the embodiment described above, the connection of the front end portion of the lateral part 5a of the center frame member 5 to the front header member 4 and the connection of the lower end portion of the vertical part 5b of the center frame member 5 to the floor panel member 11 are carried out by welding, it is possible to achieve these connections with bolts and nuts in place of welding. In case of the connections with bolts and nuts, the center frame member 5 can be mounted to the vehicle body 1 to be adjustable in its position in the direction of the length of the vehicle body 1.

Figure 8:
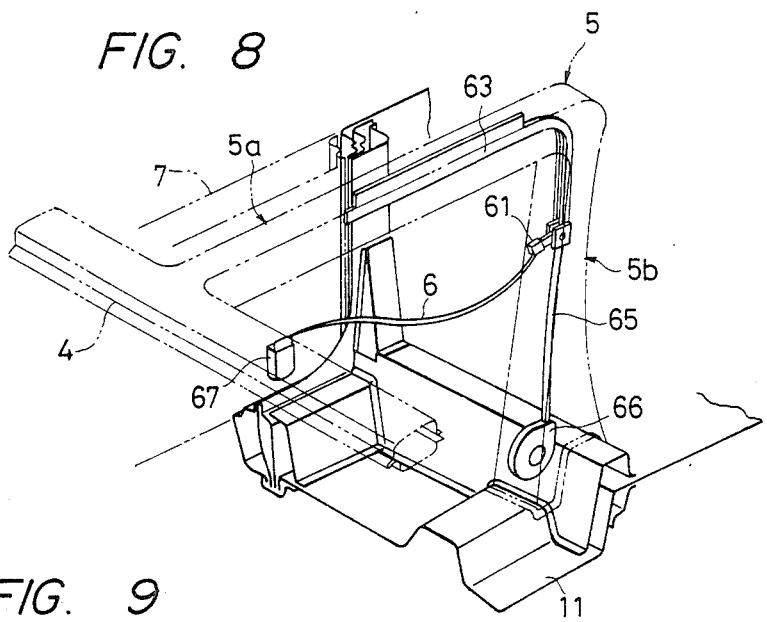
FIG. 8 is a schematic perspective view showing a part of another embodiment of arrangement for forming a vehicle body according to the present invention.
Figure 9:
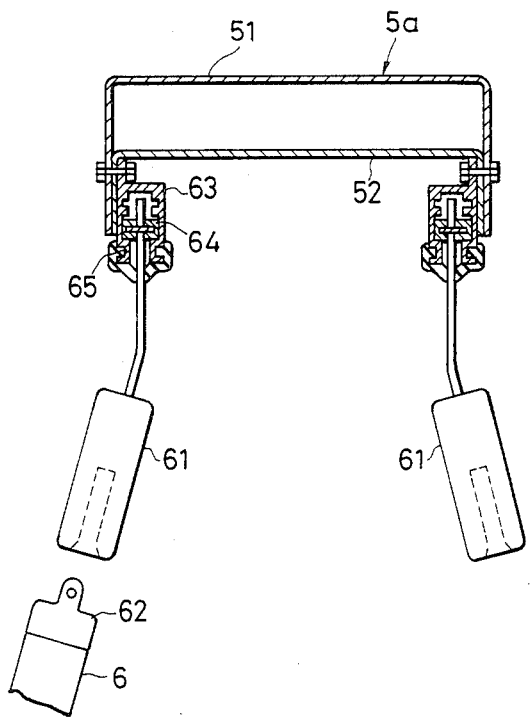
FIG. 9 is a schematic cross-sectional view showing a portion of the embodiment shown pertially in FIG. 8.

FIGS. 8 and 9 show a part of another embodiment of arrangement for forming a vehicle body according to the present invention. In FIGS. 8 and 9, members, parts and portions corresponding to those of FIGS. 1 to 7 are marked with the same references.

Figure 5:
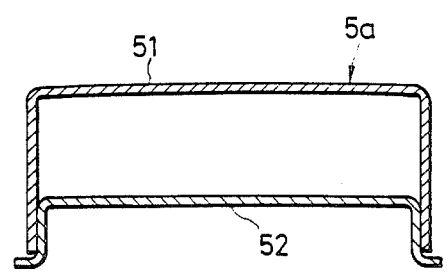
FIG. 5 is a schematic cross-sectional view taken on line V—V of FIG. 2.

In the embodiment shown in FIGS. 8 and 9, safety belts 6 for a driver's seat and a navigator's seat, that is, right and left front seats are engaged with the center frame member 5 (In FIG. 5, only one of the safety belts 6 for the right front seat is shown). The safety belt 6 is formed into a so-called passive safety belt which is fastened to be put on a person on the seat from his shoulder on the left to his waist on the right and released automatically when a right side door 7 is opened.

The safety belt 6 is provided at its one end with a buckle 61 and a metallic fitting 62 connectable with the buckle 61. The buckle 61 is supported by a sliding member 64 which is engaged slidably with a guide rail 63 fixed along the lateral part 5a and the vertical part 5b of the center frame member 5. The sliding member 64 is connected to a belt 65 which is provided in the vertical part 5b of the center frame member 5 to be driven by a motor 66 fixed in the lower portion of the vertical part 5b. Accordingly, one end of the safety belt 6 at which the buckle 61 and the metallic fitting 62 are provided moves along the guide rail 63 when the motor 66 operates.

The other end of the safety belt 6 is coupled with a retractor 67 attached to the lower rear portion of the right side door 7. The retractor 67 is operative to retract automatically a loosened part of the safety belt 6.

When a person sits on the right front seat and the right side door 7 is closed, the safety belt 6 is fastened to be put on the person with one end thereof held at the rear end of the guide rail 63 which is disposed at the upper portion of the vertical part 5b of the center frame member 5 and the other end thereof supported by the retractor 67, and when the right side door 7 is opened by the person sitting on the right front seat, the motor 66 is operated in response to the opening of the right side door 7 to permit one end of the safety belt 6 to slide along the guide rail 63 toward the front end of the guide rail 63, so that the safety belt 6 is released from the person.

The safety belt 6 for the left front seat is arranged also in the same manner as the safety belt 6 for the right front seat. As described above, in the embodiment shown in FIGS. 8 and 9, the safety belts 6 for the right and left front seats are furnished in a preferable manner in a room space formed in the vehicle body 1.

Although the safety belts 6 of the single strap type are provided in the embodiment shown in FIGS. 8 and 9, it is to be understood that safety belts of the twofold strap type can be furnished in place of the safety belts 6 mentioned above. In such a case, each of the safety belts of the twofold strap type is provided, for example, with one end thereof engaged movably with the guide rail 63, the other end thereof coupled with a retractor attached to the lower end portion of the vertical part 5b of the center frame member 5 or to the floor panel member 11, and a middle portion coupled with a guide ring mounted slidable on the lower rear portion of the right side door 7 or a left side door.

Figure 10:
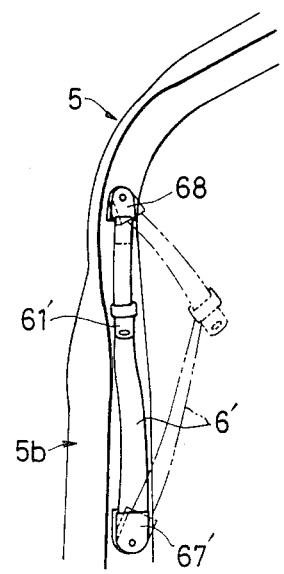
FIG. 10 is a schematic side view showing a port of a further embodiment of arrangement for forming a vehicle body according to the present invention.

FIG. 10 shows partially a further embodiment of arrangement for forming a vehicle body according to the present invention. In this embodiment, a safety belt 6' having fixed anchor points is furnished. One end of the safety belt 6' is mounted to be rotatable through a metallic fitting 68 to the upper portion of the vertical part 5b of the center frame member 5 and the other end of the safety belt 6' is coupled with a retractor 67' mounted to the lower portion of the vertical part 5b of the center frame member 5. Further, a buckle 61' is provided at a middle portion of the safety belt 6'. The buckle 61' is coupled, as occasion demands, with a metallic fitting attached to one end of another safety belt (not shown in FIG. 10), the other end of which is fixed on the side portion of the floor panel member 11.

Figure 11:
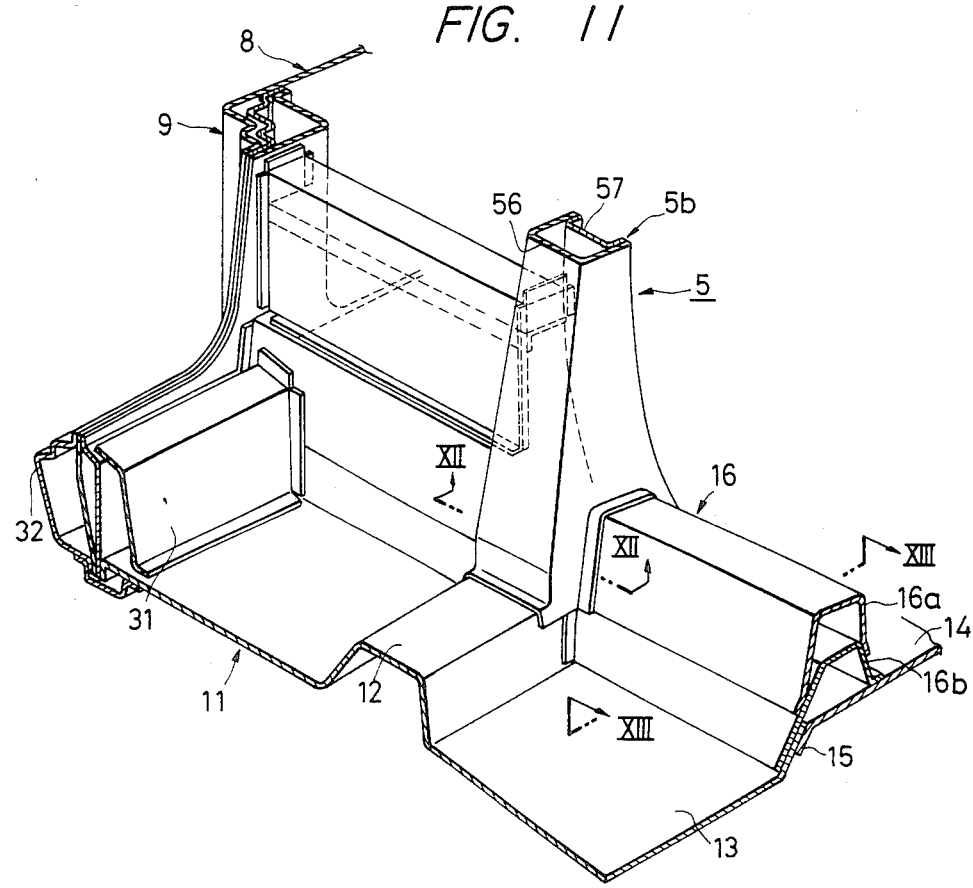
FIG. 11 is a schematic perspective view showing a part of an vehicle body of the open-top type to which a further embodiment of arrangement for forming a vehicle body according to the present invention is applied.
Figure 12:
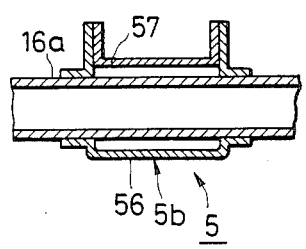
FIG. 12 is a schematic cross-sectional view take on line XII—XII of FIG. 11.
Figure 13:
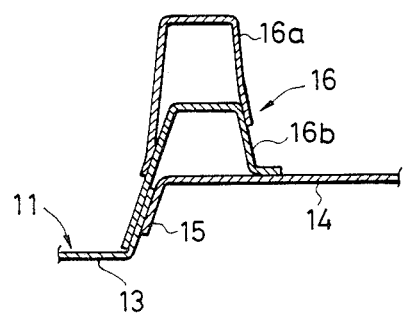
FIG. 13 is a schematic cross-sectional view taken on line XIII—XIII of FIG. 11.

FIGS. 11, 12, and 13 show a part of a vehicle body of the cabriolet type to which a further embodiment of arrangement for forming a vehicle body according to the present invention is applied. In FIGS. 11 to 13, members, parts and portions corresponding to those of FIGS. 6 to 7 are marked with the same references and further description thereof will be omitted.

In the arrangement shown in FIGS. 11 to 13, a cross member 16 is fixed on the floor panel member 11 so as to cover the slant panel component 15 of the floor panel member 11 and elongates in the direction of the width of the vehicle body to couple therethrough lower end portion of the vertical part 5b of the center frame member 5 with each of the lower ends of the right and left center pillars 9 located at the front ends of the right and left side panel members 8, respectively. As shown clearly in FIG. 13, the cross member 16 is composed of a lower cross member component 16b which is connected to both of the upper surface of the front panel component 13 of the floor panel member 11 and the upper surface of the rear panel component 14 so as to form a lower framed cross section together with the slant panel component 15 and the rear panel component 14 and an upper cross member component 16a which is mounted on and connected to the lower cross member component 16b so as to form an upper framed cross section together with the lower cross member component 16b. The upper cross member component 16a passes through the lower end portion of the vertical part 5b of the center frame member 5, as shown clearly in FIG. 12.

With such a two-story configuration as forming the upper and lower framed cross sections, the cross member 16 itself has furthermore increased structural stability.

Figure 14:
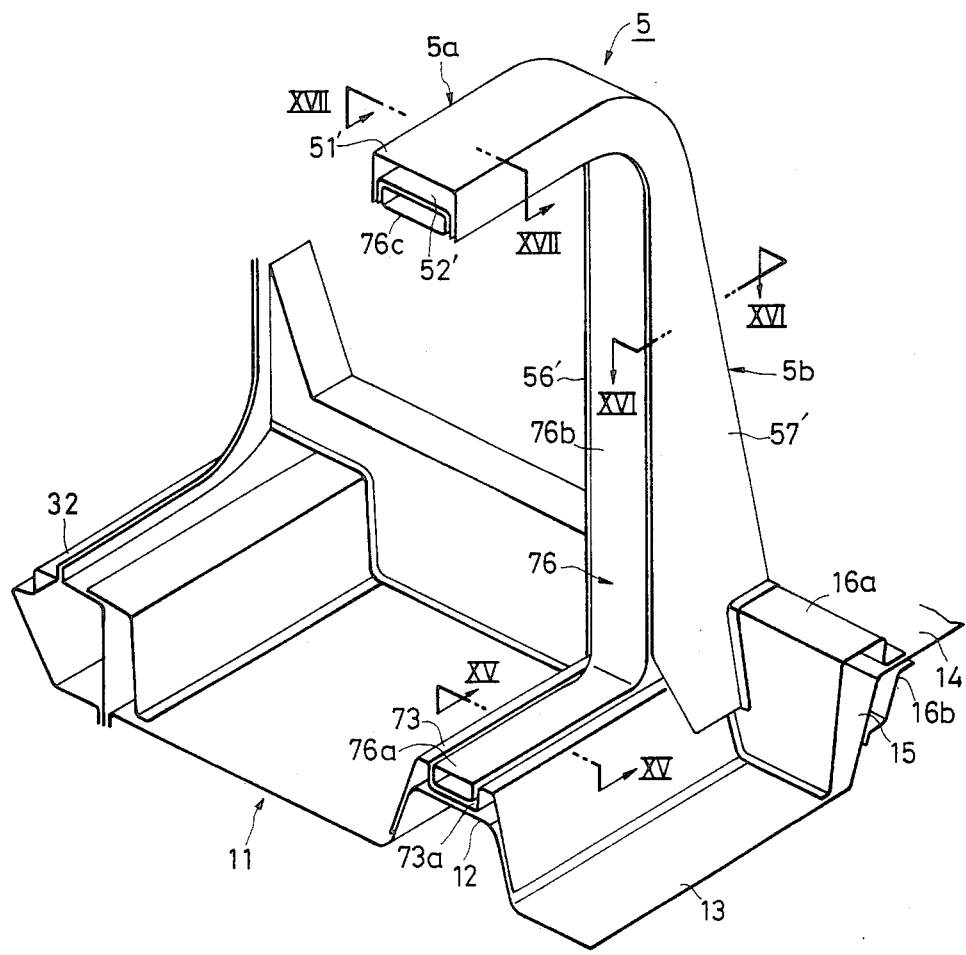
FIG. 14 is a schematic perspective view showing a part of a vehicle body of the open-top type to which a further embodiment of arrangement for forming a vehicle body according to the present invention is applied.

FIG. 14 shows a part of a vehicle body of the cabriolet type to which a still further embodiment of arrangement for forming a vehicle body according to the present invention is applied. In FIG. 14 also, members, parts and portions corresponding to those of FIG. 6 are marked with the same references and further description thereof will be omitted.

In the arrangement shown in FIG. 14, a reinforcement 73 is provided to cover the floor tunnel portion 12 formed on the floor panel member 11 for reinforcing the same. In relation to the slant panel component 15 of the floor panel member 11, the cross member 16 composed of the upper and lower cross member components 16a and 16b is fixed in the same manner as the arrangement shown in FIGS. 6 and 7.

Figure 16:
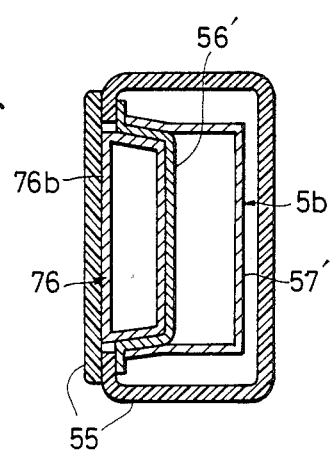
FIG. 16 is a schematic cross-sectional view taken on line XVI—XVI of FIG. 14.

The vertical part 5b of the center frame member 5 comprises a front frame component 56' and a rear frame component 57' coupled with each other to form a rectangular framed cross section, as shown in FIG. 16. The front frame component 56' is incorporated with a lower frame component 52' and the rear frame component 57' is incorporated with the upper frame component 51'. The upper and lower frame components 51' and 52' form the lateral part 5a of the center frame member 5 and are coupled with each other to create a rectangular framed cross section continuous to the rectangular framed cross section formed in the vertical part 5b. The lower end portion of the vertical part 5b of the center frame member 5 is connected to the floor panel member 11 in such a manner that the front portion of the rear frame component 57' bestrides the floor tunnel portion 12 in the direction of the width of the vehicle body and the rear portion of the rear frame component 57' bestrides the upper cross member component 16a in the direction of the length of the vehicle body.

Figure 15:
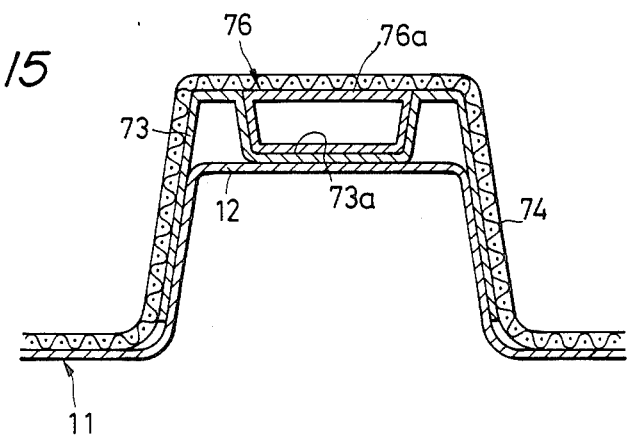
FIG. 15 is a schematic cross-sectional view taken on line XV—XV of FIG. 14.
Figure 17:
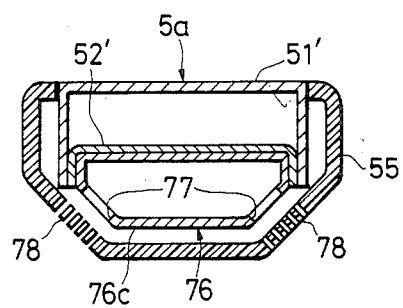
FIG. 17 is a schematic cross-sectional view taken on line XVII—XVII of FIG. 14.

Then, an air duct 76 is provided along the floor tunnel portion 12 and the center frame member 5. A portion 76a of the air duct 76 on the floor tunnel portion 12 is placed in a groove 73a formed on the reinforcement 73 and covered by a carpet 74 laid on the floor panel member 11, as shown in FIG. 15. The front end (not shown in FIG. 14) of the portion 76a is connected to the air conditioning unit 70 such as shown in FIG. 1. A portion 76b of the air duct 76 extending along the vertical part 5b of the center frame member 5 is disposed in a groove formed on the front frame component 56' and covered by a trimming member 55 which covers also the front and rear frame components 56' and 57', as shown in FIG. 16. Further, a portion 76c of the air duct 76 extending along the lateral part 5a of the center frame member 5 is disposed under the lower frame component 52' and covered by the trimming member 55 which covers also the upper and lower frame components 51' and 52', as shown in FIG. 17. At the portion 76c of the air duct 76, a plurality of blowoffs 77 are provided, and a plurality of grilles 78 are provided on the trimming member 55 at positions corresponding to the blowoffs 77.

In the vehicle body to which the embodiment shown in FIGS. 14 to 17 is applied, the air duct 76 is provided along the center frame member 5 so as to guide air flow from the air conditioning unit 70 to the lateral part 5a of the center frame member 5 which is positioned above the right and left front seats and to make downward air flow from the blowoffs 77 in the room space formed in the body, and therefore effective air conditioning is performed in the room space, especially in the condition in which the room space is covered with a folding top.

Figure 18:
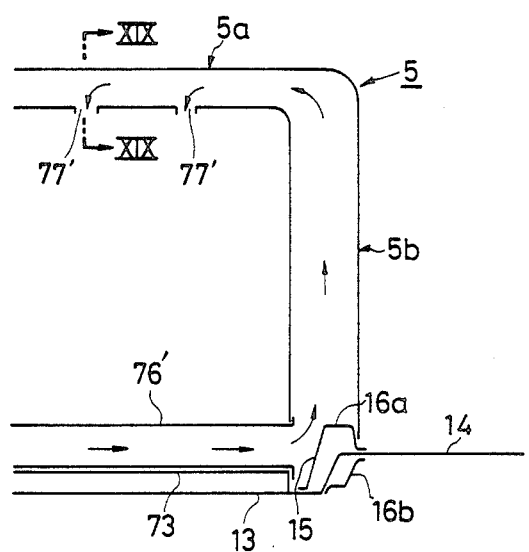
FIG. 18 is a schematic illustration showing partially a still further embodiment of arrangement for forming a vehicle body according to the present invention.

FIG. 18 shows a portion of a further different embodiment of arrangement for forming a vehicle body according to the present invention. In this embodiment, the front frame member 5 itself is used directly as an air duct.

Figure 19:
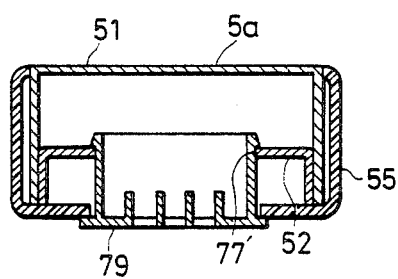
FIG. 19 is a schematic cross-sectional view taken on line XIX—XIX of FIG. 18.

Referring to FIG. 18, an air duct 76' which extends along the floor tunnel portion 12 from the air conditioning unit 70 is connected to the lower end portion of the vertical part 5b of the center frame member 5 with its end opening at the inside of the vertical part 5b. Accordingly, air flow from the air conditioning unit 70 is guided through the air duct 76' to the inside of the vertical part 5b and further transmitted to pass through the inside of the vertical part 5b to the inside of the lateral part 5a of the center frame member 5. Then, the air flow reaches to the inside of the lateral part 5a gets out of blowoffs 77' formed on the lower frame component 52 of the lateral part 5a to make downward air flow in the room space in the vehicle body. As shown in FIG. 19, a louver 79 may be disposed between the lower frame component 52 and the trimming member 55 covering the lateral part 5a at each of the blowoffs 77'.

In the embodiment having the center frame member 5 so arranged as to be shown in FIG. 18, the air duct 76' extending from the air conditioning unit 70 can be reduced in length and a compact air conditioning system in the vehicle body can be obtained. Besides, the number of parts for constituting an air conditioning system in the vehicle body is effectively reduced.

Although, in each embodiments shown in FIGS. 14 to 19, the air flow from the air conditioning unit 70 is guided to the air duct 76 or 76', it is to be understood that fresh air from the outside can be guided also to the air duct 76 or 76' as occasion demands. Furthermore, although the air flow from the air conditioning unit 70 is guided to the inside of the center frame member 5 through the air duct 76' in the arrangement shown in FIG. 18, it is possible to utilize the hollow spaces formed in the side sill 32 provided at the outside of the floor panel member 11 and in the cross member 16 for guiding the air from the air conditioning unit 70 to the inside of the center frame member 5 without using the air duct 76'.

What is claimed is:

1. An arrangement for forming partially a vehicle body of the open-top type, the arrangememt comprising;
    a front header member provided at an upper end portion of a front windshield for interconnecting therethrough right and left front pillars,
    a center frame member including a lateral part elongating in a direction of the length of the body with its front end portion connected to a central portion of said front header member and a vertical part elongating in a direction of the height of the body with its upper end portion connected to a rear end portion of said lateral part and its lower end portion connected to a floor panel member, right and left center pillars elongating upward from right and left side portions of said floor panel member, respectively, and
    a cross member for coupling said lower end portion of the vertical part of the center frame member with each of lower ends of said right and left center pillars and being connected to said floor panel member so as to form a frame cross section together with said panel member.

2. An arrangement according to claim 1, wherein the lower end portion of said vertical part of the center frame member is fixedly connected to a floor tunnel portion which is formed on said floor panel member and elongates in the direction of the length of the body.

3. An arrangement according to claim 1, wherein said cross member comprises upper and lower cross member components with which said framed cross section is divided into upper and lower portions.

4. An arrangement according to claim 3, wherein said upper cross member component is coupled with an upper surface of said floor panel member to form said upper portion of the framed cross section together with said floor panel member and said lower cross member component is coupled with an under surface of said floor panel member to form said lower portion of the framed cross section together with said floor panel member.

5. An arrangement according to claim 3, wherein said lower cross member component is coupled with an upper surface of said floor panel member to form said upper portion of the framed cross section together with said floor panel member and said upper cross member component is mounted on and coupled with said lower cross member component to form said upper portion of the framed cross section together with said lower cross member component.

6. An arrangement according to claim 1, wherein said floor panel member comprises a front panel component and a rear panel component disposed behind said front panel component to be higher that said front panel component, and said cross member has its front end portion connected to said front panel component and its rear end portion connected to said rear panel component.

7. An arrangement according to claim 1, wherein said center frame member comprises a first frame component forming a lower portion of said lateral part and a front portion of said vertical part, and a second frame component forming an upper portion of said lateral part and a rear portion of said vertical part, said first and second frame components being coupled with each other to form a framed cross section.

8. An arrangement according to claim 7, wherein a front end portion of said second frame component is provided with a pair of reinforcing depressions formed on side projections thereof and coupled with said front header member.

9. An arrangement according to claim 1, wherein said lower end portion of the vertical part of the center frame member is connected to the floor panel member with its front portion bestriding a floor tunnel portion formed on said floor panel member to elongate in the direction of the length of the body and its side portions each bestriding said cross member in the direction of the width of the body.

10. An arrangement according to claim 9, wherein said center frame member further includes a reinforcing plate member provided to be surrounded by said lower portion of the vertical part of the center frame member.

11. An arrangement according to claim 1, wherein said center frame member is provided with a portion of an air duct.

12. An arrangement according to claim 11, wherein said center frame member is constructed to have a framed cross section so as to form said portion of the air duct.

13. An arrangement according to claim 11, wherein said lower end portion of the vertical part of the center frame member is connected to a floor tunnel portion which is formed on said floor panel member and elongates in the direction of the length of the body and said tunnel portion provided thereon with a reinforcement having a groove elongating in the direction of the length of the body, and said portion of the air duct is placed in said groove.

14. An arrangement according to claim 11, wherein said center frame member is provided thereon with a groove elongating along one side portion of said center frame member and said portion of the air duct is placed in said groove.

15. An arrangement according to claim 1, wherein said center frame member is engaged with at least one safety belt for a front seat.

16. An arrangement according to claim 15, wherein at least one end of said safety belt is coupled with said center frame member.

17. An arrangement according to claim 16, wherein said safety belt has one end coupled slidably with a guide rail fixed along said center frame member and the other end is adapted to be coupled with a side door mounted on the body.

18. An arrangement for forming partially a vehicle body of the open-top type, the arrangement comprising a front header member provided at an upper end portion of a front windshield for interconnecting therethrough right and left front pillars, and a center frame member including a lateral part elongating in a direction of the length of the body with its front end portion connected to a central portion of said front header member and a vertical part elongating in a direction of the height of the body with its upper end portion connected to a rear end portion of said lateral part and its lower end portion connected to a floor panel member, wherein said floor panel member comprises a front panel component and a rear panel component disposed behind and above said front panel component, and the lower end portion of said vertical part of the center frame member is fixedly connected to a floor tunnel portion which is formed on said floor panel member and elongates in the direction of the length of the body so that said vertical part of the center frame member stands upright on the floor panel member and spans said front and rear panel components.

19. An arrangement according to claim 18, wherein said center frame member comprises a first frame component forming a lower portion of said latral part and a front portion of said vertical part, and a second frame component forming an upper portion of said lateral part and a rear portion of said vertical part, said first and second frame components being coupled with each other to form a framed cross section.

20. An arrangement according to claim 19, wherein a front end portion of said second frame component is provided with a pair of reinforcing depression formed on side projections thereof and coupled with said front header member.

21. An arrangement according to claim 18, wherein said center frame is provided with a portion of an air duct.

22. An arrangement according to claim 21, wherein said center frame member is constructed to have a framed cross section so as to form said portion of the air duct.

23. An arrangement according to claim 21, wherein said lower end portion of the vertical part of the center frame member is connected to a floor tunnel portion which is formed on said floor panel member and elongates in the direction of the length of the body and said tunnel portion provided thereon with a reinforcement having a groove elongating in the direction of the length of the body, and said portion of the air duct is placed in said groove.

24. An arrangement according to claim 21, wherein said center frame member is provided thereon with a groove elongating along one side portion of said center frame member and said portion of the air duct is placed in said groove.

25. An arrangement according to claim 18, wherein said center frame member is engaged with at least one safety belt for a front seat.

26. An arrangment according to claim 25, wherein at least one end of said safety belt is coupled with said center frame member.

27. An arrangement according to claim 26, wherein said safety belt has one end coupled slidably with a guide rail fixed along said center frame member and the other end is adapted to be coupled with a side door mounted on the body.

* * * * *